United States Patent
Yao et al.

(10) Patent No.: US 11,121,764 B2
(45) Date of Patent: Sep. 14, 2021

(54) NETWORK ACCESS MANAGEMENT

(71) Applicant: AST & Science, LLC, Miami, FL (US)

(72) Inventors: Huiwen Yao, Potomac, MD (US); Abel Avellan, Coral Gables, FL (US)

(73) Assignee: AST & Science, LLC, Miami, FL (US)

( * ) Notice: Subject to any disclaimer, the term of this patent is extended or adjusted under 35 U.S.C. 154(b) by 0 days.

(21) Appl. No.: 17/072,985

(22) Filed: Oct. 16, 2020

(65) Prior Publication Data
US 2021/0119695 A1 Apr. 22, 2021

Related U.S. Application Data

(60) Provisional application No. 62/923,158, filed on Oct. 18, 2019.

(51) Int. Cl.
| | |
|---|---|
| *H04B 7/185* | (2006.01) |
| *H01Q 5/50* | (2015.01) |
| *H04W 76/10* | (2018.01) |
| *H01Q 3/26* | (2006.01) |
| *H01Q 25/00* | (2006.01) |

(Continued)

(52) U.S. Cl.
CPC ....... *H04B 7/18513* (2013.01); *H01Q 3/2605* (2013.01); *H01Q 5/50* (2015.01); *H01Q 25/00* (2013.01); *H04B 7/10* (2013.01); *H04B 7/1851* (2013.01); *H04B 7/18523* (2013.01); *H04B 7/18578* (2013.01); *H04B 7/2041* (2013.01); *H04W 16/28* (2013.01); *H04W 48/20* (2013.01); *H04W 76/10* (2018.02); *H04W 84/06* (2013.01)

(58) Field of Classification Search
CPC ............. H04B 7/18513; H04B 7/2041; H04B 7/1851; H04B 7/10; H04B 7/18508; H04B 7/18523; H04B 7/18578; H04W 48/20; H04W 76/10; H04W 16/28; H04W 84/06; H01Q 3/2605; H01Q 5/50; H01Q 25/00

See application file for complete search history.

(56) References Cited

U.S. PATENT DOCUMENTS

| | | | |
|---|---|---|---|
| 5,642,358 A | * | 6/1997 | Dent ...................... H01Q 1/288 342/51 |
| 6,697,619 B1 | | 2/2004 | Hogberg et al. |

(Continued)

FOREIGN PATENT DOCUMENTS

| | | |
|---|---|---|
| EP | 1107476 A2 | 6/2001 |
| WO | WO-01/26251 A2 | 4/2001 |

OTHER PUBLICATIONS

International Search Report and Written Opinion for PCT/US2020/056016, dated Feb. 15, 2021, 11 pages.

*Primary Examiner* — Fred A Casca
(74) *Attorney, Agent, or Firm* — Blank Rome LLP

(57) ABSTRACT

Within a satellite communications system, a base station communicates with standard compliant user equipment (UE) via a satellite having a field of view. The base station has a processor that instructs the satellite to generate a wide beam signal covering a plurality of cells in the field of view, and detects an access request from a user equipment within the plurality of cells over the wide beam signal. The base station, comprising a processing device such as an eNodeB, then generates one or more network broadcast/access signals that is uplink to a satellite and broadcasted via one or more nominal beams generated by the satellite, covering all the inactive cells, one of the plurality of cells having the access request.

27 Claims, 4 Drawing Sheets

(51) Int. Cl.
*H04B 7/10* (2017.01)
*H04B 7/204* (2006.01)
*H04W 16/28* (2009.01)
*H04W 48/20* (2009.01)
*H04W 84/06* (2009.01)

(56) References Cited

U.S. PATENT DOCUMENTS

| | | | |
|---|---|---|---|
| 9,973,266 B1 | 5/2018 | Avellan et al. | |
| 2008/0311844 A1* | 12/2008 | Eidenschink | H04B 7/2041 |
| | | | 455/3.02 |
| 2015/0326710 A1* | 11/2015 | Amerling | G06Q 10/10 |
| | | | 379/243 |
| 2019/0124698 A1* | 4/2019 | Wu | H04W 74/0841 |
| 2020/0100291 A1* | 3/2020 | Ravishankar | H04W 74/0833 |

* cited by examiner

NETWORK ACCESS MANAGEMENT

RELATED APPLICATIONS

This application claims the benefit of priority of U.S. Provisional Application No. 62/923,158, filed on Oct. 18, 2019, the content of which is relied upon and incorporated herein by reference in its entirety.

BACKGROUND OF THE DISCLOSURE

To minimize the occupied bandwidth resource of the gateway beams by the needed network broadcast/access channels for the beams which do not carry real traffic, smallest channel bandwidth in LTE, i.e. 1.4 MHz channel can be utilized, as the network broadcast/access channels for the beams covering the cells that do not have traffic at any given time. There may be a few thousand cells under the field of view (FOV) of a given satellite without traffic. A typical design has a dedicated beam for each cell and a network broadcast/access channel for each beam covering a cell without traffics.

However, not all 3GPP bands support 1.4 MHz channel bandwidth. Using wider channel bandwidth for access requires more gateway beam bandwidth, adding design complexity for no revenue generation functionality, such as for example: using additional bands for gateway beam, or/and adding additional gateway beam(s), or using higher frequency with wider bandwidth.

SUMMARY OF THE DISCLOSURE

Accordingly, there is a need for a solution to minimize the gateway bandwidth requirement with network broadcast/access capability for all the cells with and without traffic within the FOV of a given satellite. The present disclosure minimizes the total resources (bandwidth) used for network broadcasting/accessing over a satellite entire coverage area with flexibility and scalability.

A satellite cellular system is shown in FIG. 1 composed of large antennas on satellite generating large quantity of narrow beams for user links, gateway beams with large operational bandwidth for routing user beam traffics and the network access information to/from ground gateway stations, and gateway stations as well as an associated ground network.

DETAILED DESCRIPTION OF THE PREFERRED EMBODIMENTS

Figure 1:
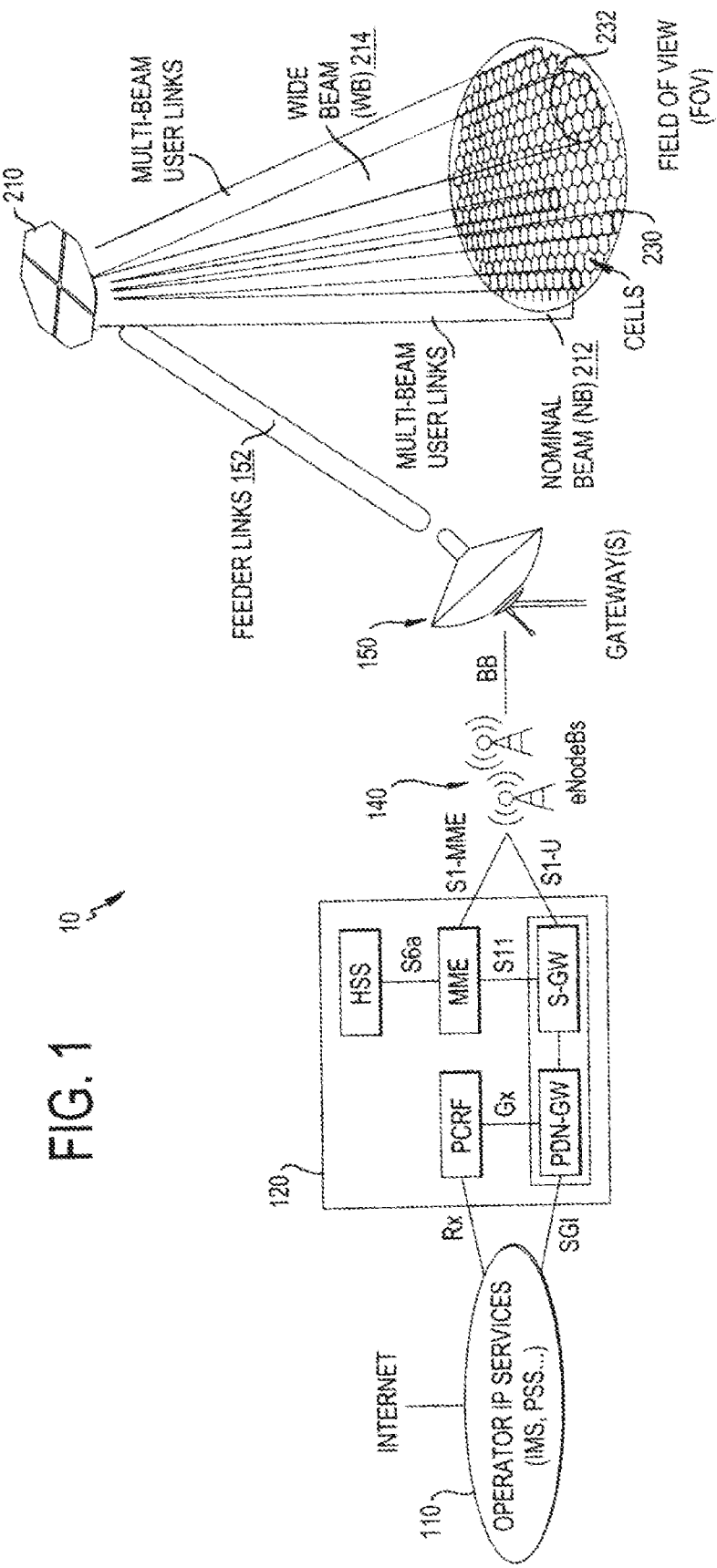
FIG. 1 shows a satellite system in accordance with an example embodiment of the present disclosure.

In describing the preferred embodiments of the present disclosure illustrated in the drawings, specific terminology is resorted to for the sake of clarity. However, the present disclosure is not intended to be limited to the specific terms so selected, and it is to be understood that each specific term includes all technical equivalents that operate in a similar manner to accomplish a similar purpose.

Turning to the drawings, FIG. 1 shows a high-powered large phased-array satellite system 10 that creates a large number of beams 212 covering small terrestrial cells 232 on the Field of View (FOV) 230 of a given satellite 210. The system 10 includes a base station 100 that communicates with the satellite 210. The base station 100 can have Base Transceivers such as eNodeBs 140 in 4G system, and a processor/core 120 (such as the Evolved Packet Core in 4G system) that communicates with the Internet 110. The base Transceivers 140 communicates signals to a gateway 150 having an antenna such as a directional antenna that communicates with the satellite 210 via gateway link signals 152. In one embodiment, the satellite 210 can be a single satellite device. In another embodiment, the satellite 210 can be a plurality of satellite antenna elements, such as disclosed in U.S. Pat. No. 9,973,266, the entire contents of which are hereby incorporated by reference.

The satellite 210 receives the gateway antenna signals 152 and retransmits them as signals to user terminals located in the satellite FOV 230, which includes one or more cells 232. The satellite signals include multi-beam user links which comprise nominal beams (NB) 212, and wide beam (WB) 214 provided by the satellite phased array antenna.

Unmodified user devices connect to these beams 212, 214 as they would to a local cell tower in a terrestrial system. The signals from/to the user devices are directed by the satellite system to/from the gateway 150 via high-throughput gateway links (such as Ka-band links, Q/V band links, or laser links). The total gateway link bandwidth is sufficient to accommodate the aggregated signals from all beams (cells) including traffic and network/access signals. At the gateway 150, the user signals are digital and/or analog processed and interfaced with custom Base Transceivers such as eNodeBs 140.

These customized eNodeBs 140 provide a standards-compliant interface to unmodified user devices, allowing them to connect as they would to a local tower while compensating for the effects (such as delay and Doppler shift) of the satellite communication system. The eNodeBs 140 are modified to tolerate large latency due to signal propagation to/from a satellite 210. Delay and Doppler shift are compensated at each cell (beam) center so the differential delay and Doppler over a size limited cell will be small and within the standard UE capability.

Figure 2:
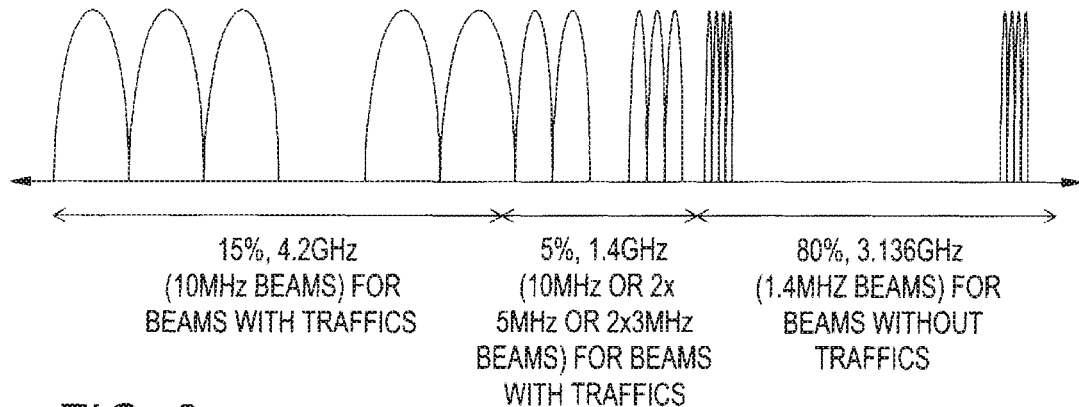
FIG. 2 shows a forward link.
Figure 3:
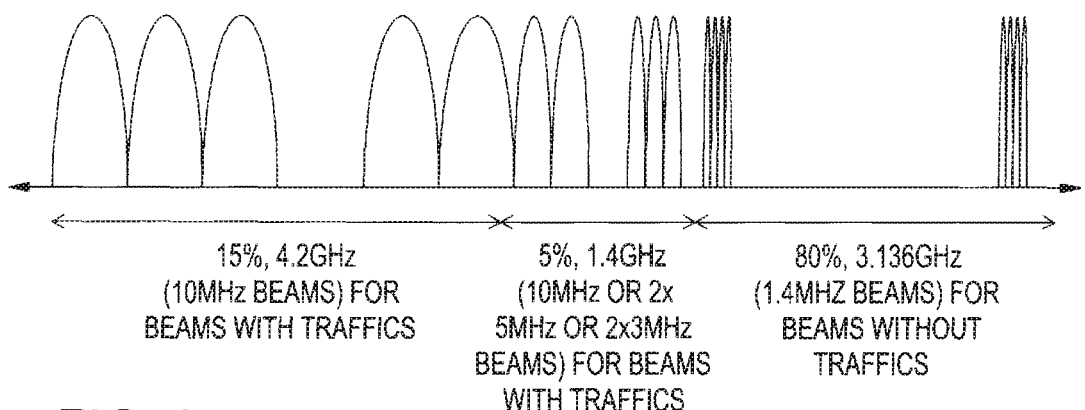
FIG. 3 shows a return link.

Referring to FIGS. 2-3 as an example using narrow channel bandwidth for network broadcasting/accessing signals for all beams that do not carry traffic, a beam is shown carrying traffic to/from UE support channel bandwidth of 1.4 MHz, 3 MHz, 5 MHz, 10 MHz, and up to 4×10 MHz in the 3GPP bands. A beam without traffic has broadcast/access channel signals using only 1.4 MHz channel bandwidth for UE access and attachment to the network. There are ~2800 nominal beamwidth beams generated by the satellite phased array antenna and each beam covers one of the ~2800 uniform cells within the entire satellite Field of View (FOV). Gateway beam utilizes Q/V band in both orthogonal polarization (i.e. LHCP and RHCP) with total 9 GHz available bandwidth. The channel in each user beam (carrying traffic or carrying no-traffic) is mapped to a frequency slot in Q/V band gateway beam. Any increase of the channel bandwidth for the beams without traffics will impact the available bandwidth for the beams with traffics and therefore has negative impact to the total satellite capacity or the number of beams available to cover the ~2800 cells in the satellite FOV resulting uncovered/unserved areas within FOV. Therefore, a more flexible approach that uses less bandwidth resource for the network broadcast/access beams while providing a complete coverage over the entire FOV is necessary.

Figure 4:
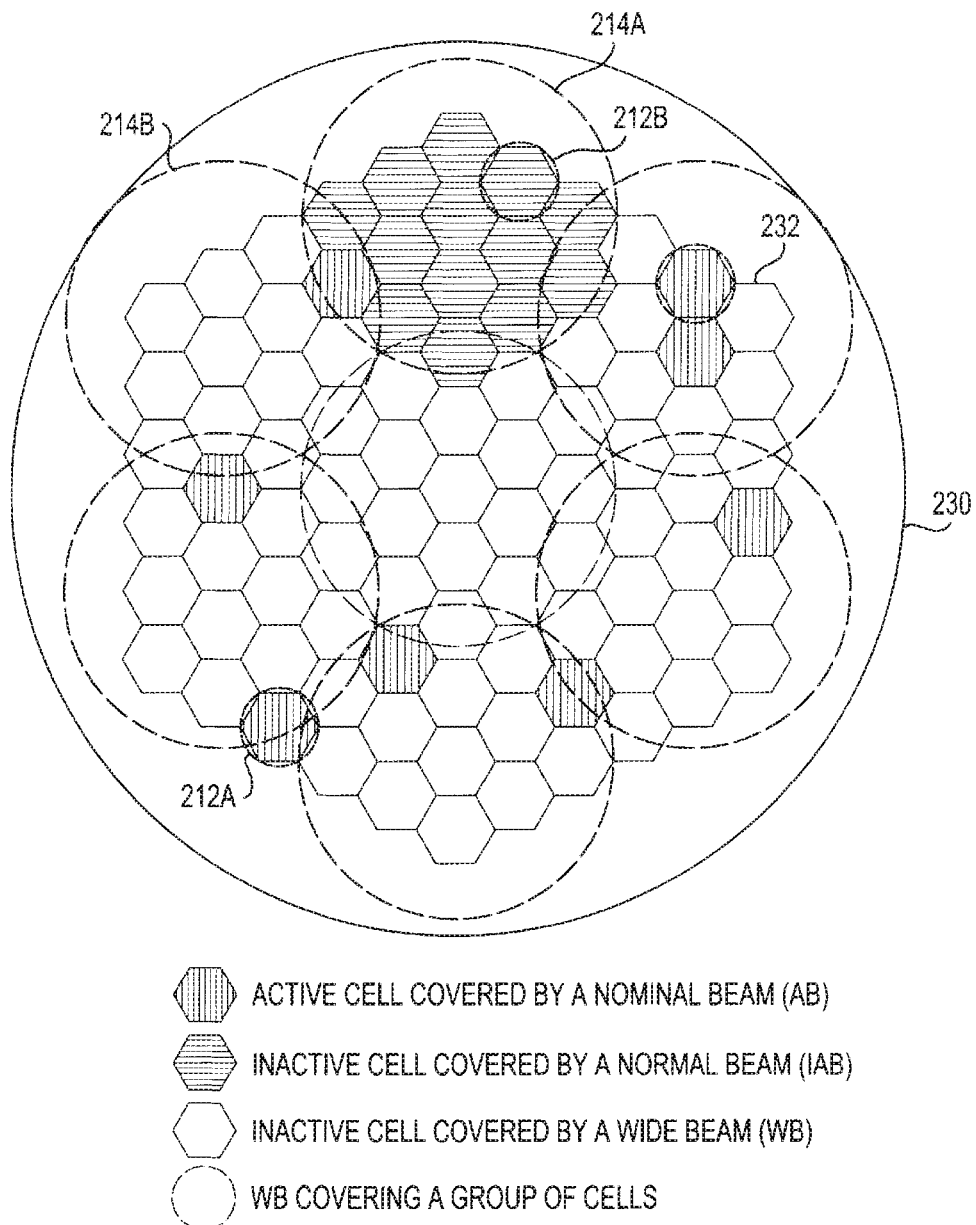
FIG. 4 shows a cell diagram.

FIG. 4 shows the satellite FOV 230 of FIG. 1, having a plurality of cells 232. Here, the cells are completely illuminated by a set of Wide Beams (WBs) 214. The beamwidth of each wide beam (WB) 214 can be controlled to cover a cluster of adjacent cells. Each nominal beam (NB) 212a, 212b can be controlled to communicate with a single cell 232. The FOV 230 can have a plurality of WB 214a, 214b, each one covering a plurality of cells 232 or portions of cells 232. The WBs 214a, 214b can overlap slightly and some cells 232 may partially or wholly be covered by more than one WB 214a, 214b.

As further shown in FIG. 4, the FOV 230 includes active cells (ACs) and inactive cells (IACs). An active cell (AC) is a cell with connected UE(s) and real traffic. The number of ACs is represented as $N_{AC}$. An active beam (AB) 212a is a nominal beam tracking a given AC with signal channel bandwidth of $BW_{AC}$. The number of ABs is represented as $N_{AB}$ ($N_{AB}=N_{AC}$). An inactive cell (IAC) is a cell without connected UE(s) and traffic except the network access information/communications. The number of IACs is represented as $N_{IC}$. An inactive beam (IAB) 212b is a nominal beam which covers an AC with signal channel bandwidth of $BW_{IC}$. The number of IABs, each covers an IAC, is represented as $N_{iBC}$. The number of wide beams (WBs), each cover a cluster of cells, is represented as $N_{WB}$. $N_{WB}$ is sufficiently large such that all the cells 232 within FOV 230 are covered by WBs with minimum overlapping. Typically, the signal channel bandwidth of a WB is $BW_{IC}$. Whereas, the number of IABs plus the number of WBs is less than the number of IACs: $(N_{iBC}+N_{WB})<N_{IC}$. And, $BW_{AC}*N_{AC}+BW_{IC}*(N_{iBC}+N_{WB})<$Total Gateway Beam Bandwidth. $BW_{IC}$ can be the minimum allowed channel bandwidth or the same bandwidth used for an active cell $BW_{AC}$. When number of ACs and the channel bandwidths are given, the total bandwidth used by all beams can be controlled via adjusting the beamwidth of the WBs (i.e. the number of WBs $N_{WB}$).

Beam 212a shows a nominal beam (NB) covering an active cell (AC), and cell 212b shows nominal beam (NB) covering an inactive cell (IAC).

Figure 5:
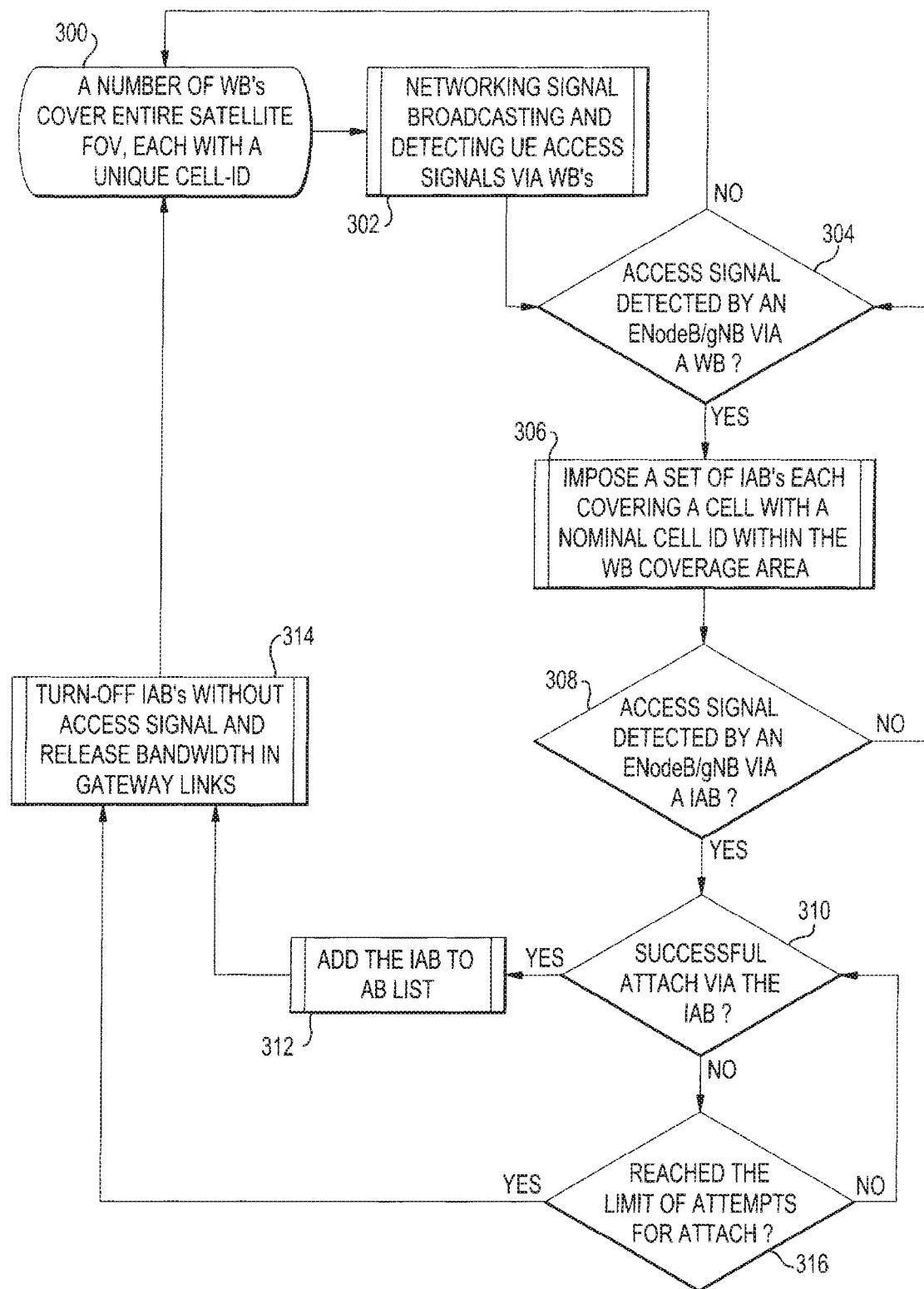
FIG. 5 is a flow diagram.

The base station 100 of the present disclosure, and specifically the eNodeB 120, provides network access management. In one embodiment of the disclosure, the base station 100 provides UE Access and Attachment, the operation of which is provided in FIG. 5. Starting at step 300, with reference to FIGS. 1, 4, the base station 100 uplinks the predetermined beamforming coefficients (based on the beamwidth for covering a cluster with a given number of cells, beam boresight, and sidelobe requirements) and the channel frequency/bandwidth to the satellite 210 via the feeder link 152 to allow the satellite 210 to form a set of one or more WBs 214, each to cover a cluster of cells (may include one or more active cells) 232. In one embodiment, the number of WBs 214 ($N_{WB}$) is sufficient to cover the entire FOV 230 of a given satellite 210. Each of the WBs 214 carries the same channel bandwidth as the active beam or the minimum channel bandwidth allowed in the operational band(s). The WBs 214 are the default beams until access request is identified within the cells illuminated by a given WB or WBs.

At step 302, the WBs 214 broadcast the network information and timing synchronization signal and search/listen for an access signal requesting a connection, such as a Physical Random Access Channel (PRACH) in cellular system, from a potential User Equipment (UE), such as a cellphone. Low S/N requirements for PRACH and downlink timing synchronization signals allow wider beam-width beams 214 to be used. A UE or UEs may not be able to successfully attach to the network (such as eNodeB in 4G/LTE or gNB in 5G) associated to WB due to large differential delay and/or Doppler shift over the large cell as well as low S/N.

At step 304, if no access signal is detected in response to the WBs 214 broadcast, the base station 100 returns to step 300 where it continues to monitor. When a UE or UEs, not belonging to any of the active cells (ACs) within the group, is detected by the eNodeB (or gNB) associated with a WB 214, step 304, one or more IABs 212b are formed by the satellite 120, via the beamforming coefficients and the beam boresight uplinked from the base station 100, to cover all the IACs within the cluster of the cells covered by that WB to locate the UE(s) to a specific cell, step 306. The frequencies and the signal bandwidths of the IABs can be the same as or different from the ones used by the WB 314. At step 306, the IAB 212b with the located UE(s) will stay and become an AB 212a to allow the UE(s) to attach to the network and start communications; the remailing IABs 212b will be turned off and their channel bandwidth will become available to locate UEs in other groups. An AB 212a should be turned off when traffic is stopped. The process will repeat until the number of active beams reaches to the system limit (by the available gateway bandwidth). IABs are only used in the area covered by a WB or WBs where a UE or UEs has been detected by the eNodeB(s) (or gNB) associated with the WB(s) to minimize the gateway beam bandwidth usage.

At step 308, if no access signal is detected by the base station 100 via an IAB 212b, the base station 100 continues to monitor, step 304. Once an access signal is detected, step 308, the base station 100 tries to attach the UE(s) via the IAB, step 310. If attachment is successful, step 310, the IAB is added to the AB list, step 312, and the IABs without an access signal returned off and the bandwidths are released in gateway links, step 314, and the system returns to step 300. If attachment is unsuccessful, step 310, the base station 100 determines if it has reached the limit for the number of attempts to attach, step 316. If the limit is reached, the IAB is also turned off and the bandwidths released, step 314, and the system returns to step 300. If the limit is not reached, further attempts are made, step 310.

As a non-limiting example for 4G/LTE, the satellite illuminates the WB with a cluster of cells configured with a very short RAR (Random Access Response) window and the minimum number of PRACH attempts possible. The delay tolerant RAR modifications (that is essential for a standard UE to attach to the network) is not necessary for the WB. Next, the UE transmits a PRACH at To and if it doesn't receive a reply, sends a PRACH again until reaching the maximum number of attempts. The eNodeB via a satellite detects the PRACH and replaces the WB by the number of IABs, that is equal to the number of ICs covered by the WB, each with the default cell ID. These new cells send proactively the RAR, such as in U.S. patent Ser. No. 16/379,399, the entire contents of which are hereby incorporated by reference.

If the UE cannot attach to the original cell associated to the WB, it goes to search new cells. It should quickly find one in the same frequency since it is being illuminated by the new cells with IABs. The UE then tries to PRACH again to the new cell and can successfully attach (due to standard compliant differential delay and doppler shift related to the smaller cell and higher S/N ratio). The other IABs covering the cells within the coverage area of the WB are switched off.

In another embodiment of the disclosure, the base station 100 can provide UE Access and Attachment. All ABs 212a and IABs 212b are beams covering the same size cells. Each IAB carries the same channel bandwidth as an AB or the minimum channel bandwidth allowed in the operational band(s). Each IAB is switched repeatedly within a group of ICs and stays X seconds at each cell, broadcasting the downlink timing synchronization and searching/listening the PRACH. When a UE or UEs is detected in an IC by the eNodeB associated with an IAB, the beam will stay and become an AB to allow the UE(s) to attach to the network and start communications. The process will repeat until the number of ABs reaches to the system limit (limited by the total gateway beam bandwidth). This can be provided as an alternative to, or in addition to, the operation of FIG. 5.

Accordingly, the satellite communications system has a base station communicating with standard compliant user equipment (UE) via a satellite having a field of view. The base station has a processing device that generates (via the satellite) a first network broadcast/access signal which is communicated over a wide beam signal 214A (FIG. 4) covering a plurality of cells in the field of view. If needed, multiple wide beam signals can be sent to a different or overlapping plurality of cells, to cover the entire field of view of that satellite. In one embodiment, the wide beam signal can be a broadcast signal to all of the plurality of cells. One or more of those cells might be inactive (IAB) 212B, that is there is no UE in that cell which is already attached to (i.e., in communication with) the base station. However, one or more of those cells might instead be active (AB) 212A, that is there is at least one UE in that cell which is already attached to the base station. For each AB cell 212A, there is an existing nominal beam signal already established with that cell to communicate with the connected UE.

The processor then detects (via the satellite) a new access request from a new UE within the plurality of cells over the wide beam signal. However, at this point, the base station processor does not know in which of the plurality of cells the new UE is located. It is noted that the new access request is likely coming from one of the IAB cells. If the new UE was in an AB cell, then it would connect with the base station through the existing nominal beam signal for that AB cell. Accordingly, in response to the new access request, the base station processor generates (via the satellite) a second network broadcast/access signal or signals that is sent over one or more nominal beams each covering one of the plurality of cells. That is, the second network access signal is sent over the new nominal beam signals for the IAB cell(s), and any existing AB cell will continue to use its own broadcast/assess signal which is unique for that active cell. The wide beam signal can continue at the same time the nominal beams are activated, since the nominal beam signals are either at different frequencies or much stronger than the wide beam signals and therefore the UE will send the access request through the nominal beam signals. In one embodiment, the wide beam signal can be deactivated when the nominal signals are activated. In one embodiment, the nominal beam signals can be at the same frequency as the wide beam signal, or can be at different frequencies.

The new UE will then respond to the second network broadcast/access signal by sending its access request on the nominal beam. The base station processor receives that response (via the satellite) and can determine which one of the plurality of cells has detected the UE access request, and in which cell the UE is located. Once the cell is identified, the processor attaches to the UE, adds that cell to the list of active cells (ACs) and start to communicate with the UE in that cell with data traffic. The network broadcast/access signals for the other nominal beams that covers the other cells (not containing the new UE) are ceased, and the system returns to generate an access signal over the wide band signal until a new UE network access request is detected. This minimizes the total bandwidth usage related to network broadcast/access request over the cells without existing connected UEs, because a nominal beam signal needs not be provided to each cell in the field of view. Rather, a plurality of wide beam signals can be provided to cover all of the plurality of cells in the field of view, and nominal beam signals can be provided for those cells in which a UE or UEs is currently communicating with the base station.

The system and method of the present disclosure can be implemented using standard UEs by computer software that accesses data from an electronic information source. The software and the information in accordance with the disclosure may be within a single processing device, such as at the eNodeB, or it may be in a central processing networked to a group of other computers or other electronic devices. The software and information may be stored on a medium such as a memory or data storage device. The entire process is conducted automatically by the processor, and without any manual interaction. A medium also includes one or more non-transitory physical media that together store the contents described as being stored thereon. In addition, unless indicated otherwise the process can occur substantially in real-time without any delay or manual action.

The description and drawings of the present disclosure provided in the paper should be considered as illustrative only of the principles of the disclosure. The disclosure may be configured in a variety of ways and is not intended to be limited by the preferred embodiment. Numerous applications of the disclosure will readily occur to those skilled in the art. For example, each nominal beam 212 has been described as being associated with a single cell 232. However, the nominal beam 212 can be associated with more than one cell 232 or less than one entire cell 232. Thus, for example, two nominal beams 212 can be provided for a single cell 232. Or, a single nominal beam 212 can cover multiple cells 232.

Therefore, it is not desired to limit the disclosure to the specific examples disclosed or the exact construction and operation shown and described. Rather, all suitable modifications and equivalents may be resorted to, falling within the scope of the disclosure.

The invention claimed is:
1. A satellite communications system comprising:
   a base station communicating with standard compliant user equipment (UE) via a satellite having a field of view, said base station comprising a processing device via the satellite generating a network broadcasting signal over a wide beam signal covering a plurality of cells in the field of view, detecting an access request from a user equipment within the plurality of cells over the wide beam signal; and
   generating, in response to detecting an access request from a user equipment within the wide beam signal, a network broadcasting signal over one or more nominal beam signals each covering one of the plurality of cells, and determining, via the one or more nominal beam signals, which one of the plurality of cells has the detected access request.

2. The satellite system of claim 1, further comprising a plurality of wide beam signals, each covering a different respective plurality of cells.

3. The satellite system of claim 1, the one or more nominal beam signals establishing a connection with the user equipment over a new nominal beam signal to conduct communications with the user equipment.

4. The satellite system of claim 3, wherein said processing device is configured to maintain a list of active user equipment connections and include the established connection in the list of active user equipment connections.

5. The satellite system of claim 1, further comprising detecting a plurality of access requests and generating respective nominal beam signals for each one of the plurality of cells having at least one connect request.

6. The satellite system of claim 1, wherein said processing device minimizes the total bandwidth usage related to network broadcast for forward beams and access request for return beams over the cells without existing connected UEs, wherein the forward beams are from the satellite to the cells, and the return beams are from the cells to the satellite.

7. The satellite system of claim 1, wherein said user equipment comprises standard cellular phones.

8. The satellite system of claim 1, wherein the one or more nominal beam signals each cover one of the plurality of cells having no previously connected UE.

9. The satellite system of claim 1, wherein the plurality of cells include an active cell having one or more connected UE and an inactive cell having no connected UEs, said processing device generating an active nominal beam signal covering each active cell and determining which one of the inactive cells of the plurality of cells has the detected access request.

10. The satellite system of claim 1, wherein the wide beam signal has a different frequency than the one or more nominal beam signals.

11. The satellite system of claim 1, wherein the wide beam signal has a same frequency as the one or more nominal beam signals.

12. The satellite system of claim 1, wherein said base station, via the satellite, allows the user equipment to attach to the network via a nominal beam signal corresponding to the determined one of the plurality of cells that has the detected access request.

13. A base station communicating with standard compliant user equipment (UE) via a satellite having a field of view, said base station comprising a processing device via the satellite generating a network broadcasting signal over a wide beam signal covering a plurality of cells in the field of view, detecting an access request from a user equipment within the plurality of cells over the wide beam signal, generating in response to detecting an access request from a user equipment within the wide beam signal, a network broadcasting signal over one or more nominal beam signals each covering one of the plurality of cells, and determining, via the one or more nominal beam signals, which one of the plurality of cells has the detected access request.

14. The base station of claim 13, further comprising a plurality of wide beam signals, each covering a different respective plurality of cells.

15. The base station of claim 13, the one or more nominal beam signals establishing a connection with the user equipment to conduct communications with the user equipment.

16. The base station of claim 14, said processing device is configured to maintain a list of active user equipment connections and include the established connection in the list of active user equipment connections.

17. The base station of claim 13, further comprising detecting a plurality of access requests and generating respective nominal beam signals for each one of the plurality of cells having at least one connect request.

18. The base station of claim 13, wherein said processing device minimizes the total bandwidth usage related to network broadcast for forward beams and access request for return beams over the cells without existing connected UEs, wherein the forward beams are from the satellite to the cells, and the return beams are from the cells to the satellite.

19. The base station of claim 13, wherein said user equipment comprises standard cellular phones.

20. The base station of claim 13, wherein the one or more nominal beam signals each cover one of the plurality of cells having no previously connected UE.

21. The base station of claim 13, wherein the plurality of cells include an active cell having one or more connected UE and an inactive cell having no connected UEs, said processing device generating an active nominal beam signal covering each active cell and determining which one of the inactive cells of the plurality of cells has the detected access request.

22. The base station of claim 13, wherein the wide beam signal has a different frequency than the one or more nominal beam signals.

23. The base station of claim 13, wherein the wide beam signal has same frequency as the one or more nominal beam signals.

24. A method for satellite communication:
generating at a base station processing device, a first network broadcasting signal over a wide beam signal covering a plurality of cells in a field of view;
detecting at the base station processing device, a first access request from a user equipment within the plurality of cells over the wide beam signal;
generating at the base station processing device, in response to detecting an access request from a user equipment within the wide beam signal, a second network broadcasting signal over one or more nominal beam signals each covering one of the plurality of cells; and
detecting at the base station processing device, a second access request from a user equipment within the one or more nominal beam signals to determine a cell from amongst the plurality of cells at which the UE is located.

25. The method of claim 24, wherein generating the first network broadcasting signal, detecting the access request, generating the second network broadcasting signal, and detecting the second access request are via one or more satellites.

26. The method of claim 24, further comprising a step of establishing at the base station processing device, a communication link with the UE at the determined cell over a new nominal beam signal.

27. The base station of claim 13, further configured to, via the satellite, allow the user equipment to attach to the network via a nominal beam signal corresponding to the determined one of the plurality of cells that has the detected access request.

* * * * *